Nov. 4, 1969 F. E. JIRIK 3,476,725

INDIRECT PROPORTION REFLUX

Original Filed April 7, 1965

INVENTOR
Frank E. Jirik
BY
*Curtis, Morris & Safford*
ATTORNEYS

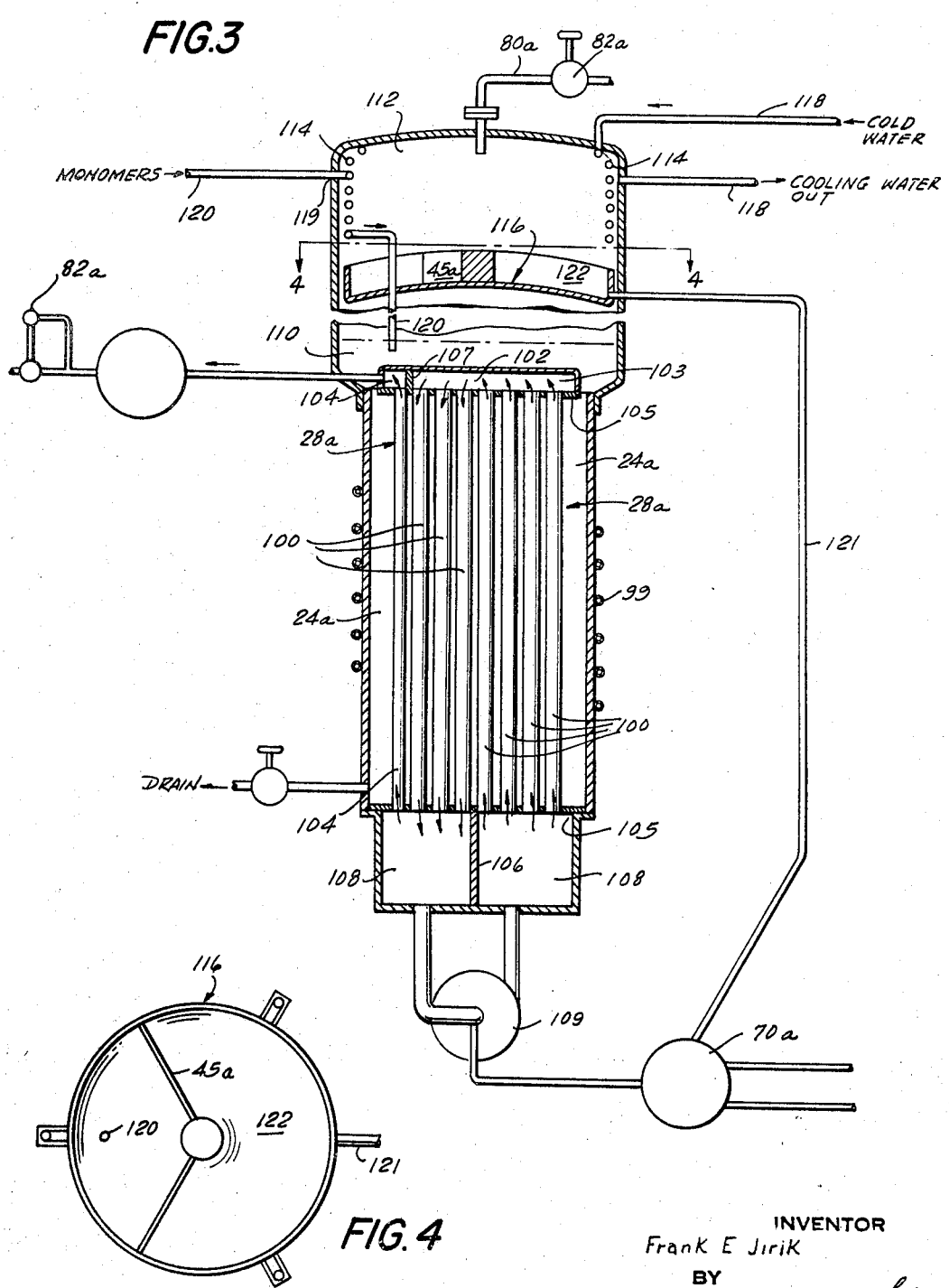

United States Patent Office 3,476,725
Patented Nov. 4, 1969

3,476,725
INDIRECT PROPORTION REFLUX
Frank E. Jirik, Apartado 4178,
San Jose, Costa Rica
Continuation of application Ser. No. 446,193, Apr. 7, 1965. This application July 25, 1967, Ser. No. 655,960
Int. Cl. C08f 1/00, 1/98, 1/82
U.S. Cl. 260—89.1        8 Claims

ABSTRACT OF THE DISCLOSURE

A process has been provided for supplying a reactant to a reaction zone, whereby the reactant is first evaporated in a zone surrounding the reaction zone, condensed and the condensate collected in a proportional relationship to a demand in the reaction zone and then introduced in the reaction zone. The proportional relationship may be in reference to the demand in the reaction zone which demand is responsive to a final product criterion, e.g. purity.

---

This is a continuation of application Ser. No. 446,193, filed Apr. 7, 1965 and now abandoned.

This invention relates to method and apparatus for chemical reactions, especially to apparatus and methods suitable for manufacturing polymers and polymer dispersions.

It has long been a problem in the polymer-manufacturing art to obtain high product uniformity especially where volumn of production is relatively small, This difficulty, which has been largely overcome in the manufacture of large-volume chemical products, persists especially in the area of emulsion-, solution- and bulk-polymerization where reaction control techniques, and especially needs for relatively small scale reactions, often make difficult or impossible conventional continuous processing. Thus, batch and semi-batch polymerizations remain today primary methods of producing such small volume products.

However, batch and semi-batch techniques also have serious problems associated therewith, even in addition to the inherent problems of batch-to-batch control and batch-to-batch product uniformity. For example, monomer distilled from a reaction mix may accumulate in headspace of a vessel in which the reaction is taking place. This monomer is likely to polymerize in the wrong places and cause clogging of passages, interference with control mechanisms, and excessive downtime for cleaning. Moreover, some monomers, like butadiene, when polymerized under other conditions than those intended, can form highly explosive polymers and thus greatly add to the hazard of a polymerization process.

Another problem, especially associated with reactions which utilize reactants requiring inhibitors, and therefore especially pertinent to polymerizations, is the necessity of distilling off the inhibited chemical reactant in order to remove the inhibitor therefrom. This operation not only requires extra equipment but also a large quantity of energy which usually is largely wasted, even in larger scale chemical plants where such losses are of serious magnitude.

Therefore, it is an object of the present invention to provide apparatus and a process utilizing such apparatus whereby substantially continuous reactions may be conducted with surprising uniformity.

It is a further object of this invention to provide a compact, highly efficient, chemical reactor. It is also an object to provide such reactor and a method of operating which are well adapted to local small scale production near the smaller volume markets or areas of use.

It is also an object of the invention to provide apparatus for intermittent or substantially continuous processing wherein reaction control and product uniformity are achieved.

It is another object of the invention to provide a process whereby, and equipment wherein, energy economy is achieved.

In the drawings I have shown, diagrammatically, apparatus designed to use the invention:

FIGURE 3 is an axial section of another apparatus useful in the present invention.

FIGURE 4 is a top view of a condensate-proportioning device associated with the apparatus used in FIGURE 3.

Figure 1:
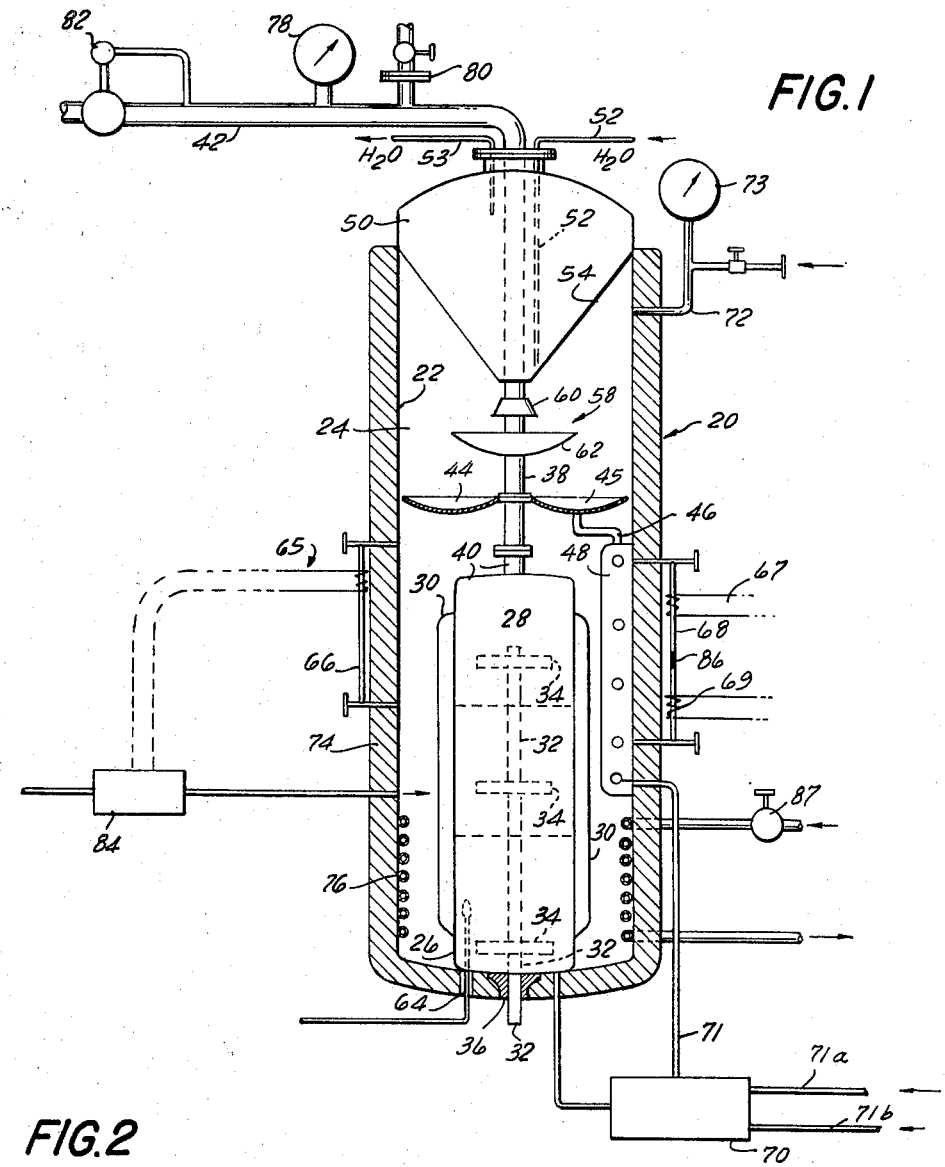
FIGURE 1 is a view in axial section of an apparatus useful in the present invention.

In FIGURE 1, reactor 20 comprises outer wall 22 surrounding a temperature equalizing chamber 24 for raw liquid and an inner wall 26 forming a reaction chamber 28. Fins 30, two of which are shown on the drawing, radiate from inner wall 26 and form means for promoting heat-transfer between chambers 24 and 28. Shaft 32 supports and drives rotary agitator blades 34 and is supported on a thrust bearing (not shown) and sealed by a bottom gland seal 36 (shown diagrammatically).

An outlet line 38 for the reacted polymer emulsion is connected at 40 to the head of inner chamber 28 for exit of reacted emulsion; and this line continues as discharge line 42 beyond the top of reactor 20.

Around outlet line 38 is positioned a proportioning dish 44 divided into segments by walls 45. This is more particularly described below. Pipe 46 connects dish 44 with a surge tank 48 shown on the inside of chamber 24.

Above this segmented proportioning dish 44 is a condenser 50, which is supplied with cooling fluid by pipe 52 which fluid is eventually exhausted through pipe 53. The condenser 50 is concentrically mounted on the outlet line 38 so that condensate runs down along conical bottom onto pipe 38 or drips into pan 44. The condenser surface 54 is water-cooled by the water from line 52.

A condensate-flow distributor 58 may advantageously be mounted on outlet line 38 between condenser 50 and proportioning dish 44. This distributor achieves a radial distribution and temperature equalization of condensate which flows down the exterior of line 38 from condenser 52 over proportioning dish 44.

A thermometer 64 is provided extending through wall 22 into inner chamber 28.

A glass tube 66 is mounted and connected as shown to indicate liquid level in outer chamber 24.

Similarly, glass tube 68 is mounted and connected to indicate the condensate level in surge tank 48. An inductance or capacitance circuit as known in the art advantageously responding to a float 86 in the sight glass is used to control operation of reactant proportioning pump 70. The inlet side of the pump is connected to surge tank 48 by pipe 71, and may have its inlet side additionally connected to receive other reactants, reaction media, etc., by pipe 71a and 71b.

Inert gas supplied through inlet line 72 enters outer chamber 24, to pressurize the chamber and a pressure gauge 73 is advantageously provided to show the pressurizing attained. This gas may be hot for heating the material contained in the outer chamber at start up, when such heating is desired.

Insulation 74 covers outer wall 26 of the apparatus and the heating coil 76 which surrounds the outer chamber 24 near the bottom.

In discharge line 42 is a pressure gauge 78, a fill connection 80, and a pressure-operated valve 82, responsive to pressure in line 42.

The above-described apparatus can be operated as follows:

A volatile chemical reactant is supplied to inner chamber 28 by pump 84. This reactant, e.g., vinyl acetate monomer, advantageously is one which has a heat of vaporization per pound less than the heat of reaction per pound evolved in inner chamber 28. This volatile reactant is distilled by evaporation in chamber 24 by the heat of the reaction in chamber 28 conducted through the inner wall 26 and along fins 30, and condensation of the reactant vapor at condenser 50. The condenaste flows down pipe 38 to proportioning dish 44.

Figure 2:
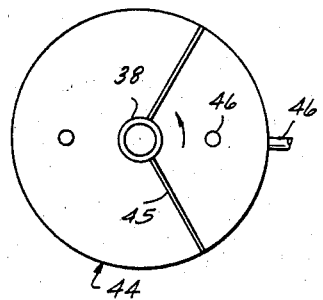
FIGURE 2 is a top view of a condensate-proportioning dish.

This dish 44, as shown in FIGURE 2, is divided into two receiving sections which receive the condensate but only in that proportion which can enter surge tank 48, from which it is pumped into inner chamber 28 as may be required to replace the material reacted. Proportioning pump 70 is so connected that, in addition to the reactant which has been condensed in the outer chamber, other reactants and/or reaction media are proportionally charged to the inner chamber by the operation thereof.

The following specific reaction may be carried out in the apparatus of the invention as follows:

One hundred pounds of vinyl acetate emulsified with 110 lbs. of water is charged through pump 70 into inner chamber 28 completely filling chamber 28, outlet line 38 and discharge line 42 to pressure operated valve 82.

Vinyl acetate is then supplied through vinyl acetate pump 84 to outer chamber 24 until pump 84 is shut off by the liquid-level control means indicated diagrammatically at 65, which is associated with level indicator glass 66. The level at which this occurs is chosen so that fins 30 are completely submerged in the vinyl acetate.

An inert gas, such as $CO_2$, is injected through pipe 72 into outer chamber 24 to maintain a pressure at which the vinyl acetate monomer will boil at 95° C.

To heat the monomer and vinyl acetate emulsion at start up, heating stem is supplied to coil 76 and agitator blades 34 rotate in the emulsion.

Proportioning pump 70 is controlled by the liquid level in surge tank 48 by electrical sensing (e.g., induction or capacitance) of the position of float 86 in the level indicator tube 68. When the amount of condensed monomer in the tank 68 drops below the desired level, float 86 drops into the lower part of the tube 68 within inductance coil 69 thereby sending a signal which serves to stop pump 70. Another such coil 67 surrounds the upper part of the tube 68 to provide for shutting off the heating fluid at 87 and, or the monomer flow at 84 should the condensate level, for some reason, rise too high.

In normal operation, however, heat generated by the polymerization of vinyl acetate within chamber 28 is sufficiently transferred through wall 26 and fins 30 to maintain the vinyl acetate monomer at 95° C., and to vaporize a quantity of vinyl acetate which utilizes the heat of polymerization ($H_r$).

The evaporated material, distilled free of any inhibitor (e.g., hydroquinone) is condensed because of the cooling effect of condenser 52 and flows down surface 54 and outlet line 38 and onto condensate flow distributor 58. This distributor comprises a conical flared section 60 and receiving dish 62. The condensate collects in the dish 62, which overflows evenly and assures the even distribution of the monomer around the proportioning dish 44 below.

The proportioning dish is divided into two sections of predetermined sized the areas of which are respectively proportional to heat of vaporization ($H_v$) of vinyl acetate, at the aforementioned 95° C. conditions and the heat of polymerization reaction ($H_r$) of vinyl acetate under conditions in the chamber 28.

$$\text{Area} \cong \frac{H_v}{H_r}$$

one compartment of the dish 44, receives over a given period of time a quantity of condensate proportional to its size and which is ideally the exact amount of monomer that was reacted during this same period of time.

The condensate is inhibitor-free and is at the proper temperature for immediate transfer to inner chamber 28 to replace vinyl acetate lost through reaction.

In an alternative embodiment of the invention shown in FIGURES 3 and 4, the reactor shown comprises an outer chamber 24a and in inner chamber 28a. The inner chamber in this case is composed of the heat-exchanger tubes 100 held together by tube sheets 105. The heads 102 and 108 of the heat exchanger are baffled at 106 and 107 to assure circulation in the zone 103 and the outlet zone 104, in which zones the chemical reaction being carried out may take place.

This tube package is set into chamber 24a and the bottom sheet 105 forms the bottom of chamber 24a in addition to holding the tubes.

Circulation pump 109 connects the two passes 108 of circulation zone 102 and operates continuously. Outlet zone 104 is relatively stagnant except as flow normally takes place therein when fresh reactants are injected into circulation zone 108 forcing product through outlet zone 104 and out of the reactor through pressure operated valve 82a. Level indicator tubes or other level control means (not shown) are used with this apparatus in the same manner they are used in the apparatus of FIGURE 1 or otherwise as is known in the art.

Outer chamber 24a comprises a lower reactant-heating section 10 in its reservoir head and a condenser section 112 above the heating section.

Condenser section 112 includes cooling coils 114 and 119 and a reflux proportioning unit 116 which serves the function of both proportioning dish 44 and surge tank 48 shown in FIGURE 1. A top view of unit 116 appears in FIGURE 3.

Cooling coils 114 are connected to, and form part of, a water supply line 118 and coils 119 form part of a reactant supply line 120 leading into outer chamber 24a.

Condensate which is collected in reflux proportioning unit 116 is in part fed to the reactor, i.e., into inner chamber 28a, through condensate line 121, proportioning pump 70a and the suction side of circulation pump 106, and in part goes back into the evaporating mass 110.

One advantage of the reactor shown in FIGURES 3 and 4 is that it provides means for rapid circulation through the reaction zone and thus markedly reduces the heat exchange area required for transmitting heat of reaction to reactant contained in outer chamber 24a from inner chamber 28a.

Temperature- and pressure-measuring devices or controls, pressure relief valve, inert gas connections, auxiliary heads for cleaning access, and the like may be added to either of the above-described reactors to the extent desired.

When using the equipment shown in FIGURE 3 for making a product which is subject to degradation, for example, an emulsion of polymer, such as polyvinylacetate, a relatively slow speed circulation pump is best e.g., a centrifugal pump operating at several hundred r.p.m. and with clearances such as to avoid excessive shearing action in the emulsion.

With the equipment shown in FIGURES 3 and 4, and a production rate of 30 gallons per hour of polyvinyl-acetate emulsion:

First, at start up, vinyl acetate monomer is added to outer chamber 24a and is heated to about 95° C. by coils 99 aqueous phase and vinyl acetate monomer in proper proportions are injected into inner chamber 28a and are circulated by pump 106 through passes 108. The rate of circulation is advantageously in the range of 20 to 40 gallons per minute and the circulation time in the reactor, typically, is 40 to 50 minutes with another 10 to 20 minutes spent in outlet zone 104 so that the total average dwell time of material in chamber 28a is about an hour.

During this hour, 16 gallons of vinyl acetate monomer is polymerized releasing 52,000 kilocalories. This heat, on being transmitted to outer chamber 24a, causes evaporation of 22.8 gallons of vinyl acetate monomer per hour. Since only 15 gallons of this monomer is required for replacing reacted vinyl acetate, the proportioning unit 116 is arranged to supply to reaction chamber 28a only $15/22.8$, or 0.66, of the condensed vinyl acetate. This is achieved by having proportioning unit 116 so divided that about 0.66 of it acts as a condensate collector section 122. This collector communicates, through condensate return line 121, with proportioning pump 70a, the actuation of which is controlled by liquid level control device sensitive to the level of monomer condensate in collector section 122. The remaining 0.34 of the condensed vinyl acetate returns to the monomer mass in outer chamber 24a.

Ideally the fraction of the monomer condensate transferred from the outer chamber to the inner chamber will be proportional to the ratio $H_v:H_r$. However, it will be realized that spurious heat losses (from radiation, for example) and spurious heat sources (from mechanical energy imparted by the circulation pump, for example), may not cancel each other out entirely, and therefore small adjustments may have to be made in the aforementioned ratio. Because this is so it is desirable that at least one partition 45a in the proportioning unit be adjustable so that, after start-up, any necessary correction can be made in the reflux proportion being conveyed to the reactor chamber. Moving the partition will increase the drain-off through line 121 or back to chamber 24a at the expense to the flow to the other.

The concentration of polyvinyl acetate monomer unreacted in the recirculating system is controlled below about 3% and advantageously 2%. These correspond, respectively with residual free monomer in the product of .075% and .05%. Similarly, if a lower percentage of monomer is required in the product a correspondingly lowered percent is maintained in the recirculating system. The advantage is clear that controlling a greater percentage in the recirculating system is much easier and can be more accurate than trying to control a few tenths or hundredths of a percent in the product.

The foregoing description of apparatus and specific processes usefully carried out therewith is not the only way of practicing the invention, on the contrary, it is intended to, and will, suggest to those skilled in the art various modifications from which they will select one most desirable for their own purposes. For example, the force driving condensate from the outer chamber to the inner chamber can be gravity.

Furthermore, the division of proportioning unit 116 or 44 may not only take into account spurious heat losses and spurious heat sources, but may also take in account the temperature of other reactants supplied. For example, if one of the reactants proportioned into the inner chamber were far below the reaction temperature, some of the heat of reaction would have to be utilized to heat this reactant and would not be available to evaporate the reactant in the outer chamber. Thus, a lesser amount of the condensate would be available to supply the reaction chamber and one of the proportioning partitions 45 would advantageously be adjusted to this condition.

In situations where the heat of reaction is insufficient to evaporate a reaction-sustaining quantity of reactant in the outer chamber such heat may be supplied to the outer chamber, for example, by sensible heat of reactants supplied, by heating coils, or convection heaters, etc., sufficient to evaporate the reactant needed for the reaction in the inner chamber.

If a reactant distilled from the outer chamber has such vapor pressure that it cannot be successfully proportioned without cooling or compressing, another proportioning pump may be mounted to provide a cool reactant or diluent (for example, an aqueous phase in emulsion polymerization reactions) to be pumped into the condensate return line in proportion to maintain the required reduced temperature whenever the main proportioning pump is actuated. Engineering variations and substitutions are contemplated within the scope of this invention.

Another variation sometimes useful in operation the instant apparatus is the use of a compatible, but relatively non-volatile, compound in the outer chamber. Such a compound can be used to increase the temperature at which condensate is volatilized, without the necessity of increasing the pressure capabilities of the reaction vessel. The relatively non-volatile chemical should advantageously be such that it will not distill in any significant quantity; although, it is possible that more volatile reactants can be used, in which case they should be chosen from compounds that do not interfere with the reaction and may be easily removed from the reaction product.

While emphasis has been placed on the use of a proportioning pump as a device for metering reactants and reaction media into the reactor, it is to be understood that such metering or proportioning devices known to the art may be utilized for this purpose.

I claim:
1. A process for making a chemical product having at least one volatile reactant at the reaction conditions, which product is formed by an exothermic reaction comprising:
   (a) introducing into a vaporization zone said volatile reactant, said vaporization zone enveloping a reaction zone in which an exothermic reaction takes place;
   (b) conducting continuously heat generated by the exothermic reaction to the vaporization zone;
   (c) volatilizing the volatile reactant;
   (d) condensing the resulting vapors of the volatile reactant;
   (e) collecting the volatile reactant condensate in a vapor collection zone having at least a first collection zone and a second collection zone, said collection zones being adjustable in volume in respect to each other;
   (f) dividing out a part of the collected condensate corresponding to the amount collected in one of the collection zones, said divided out condensate being substantially equal to the amount of volatile reactant utilized in generating said exothermic heat of reaction;
   (g) introducing the divided out proportion into the reaction zone in an amount responsive to the reactant requirement of the reaction zone and proportional to the amount of required reactants in said reaction zone to sustain said reaction; and withdrawing from the reaction zone the product formed.

2. A process according to claim 1 wherein the collection zones are adjusted in respect to each other responsive to an unreacted monomer content in the product.

3. A process according to claim 1 wherein the first and second collection zones are adjusted in respect to each other in response to the temperature of the reactants fed to the reaction zone and the heat conducted from the reaction zone to the volatilization zone.

4. A process according to claim 1 wherein the exothermic heat of reaction is supplemented by a heating fluid in response to the amount of condensate collected in said first and second collection zones.

5. A process as in claim 1 wherein said volatile reactant is purified in respect to less volatile constituents by volatilization in said volatilization zone.

6. A process as in claim 5 wherein the proportion of condensate forming said divided out condensate fed to the reaction zone is proportional to its heat of vaporization in respect to said heat of reaction and a remaining part of the condensate is recycled to the volatilizing zone.

7. The process according to claim 1 wherein the contents of the reaction zone are conveyed through the reaction zone in an intimate heat transfer relationship to the volatile reactant in the volatilization zone.

8. The process according to claim 1 wherein the volatile reactant is vinyl acetate monomer.

References Cited
UNITED STATES PATENTS
2,484,384  10/1949  Luvine et al. _____ 260—93.7
1,873,876  6/1949  Downs _____ 23—1

JOSEPH L. SCHOFER, Primary Examiner
J. A. DONAHUE, Assistant Examiner

U.S. Cl. X.R.
165—105; 260—95